United States Patent Office 3,551,346
Patented Dec. 29, 1970

3,551,346
METHOD OF MAKING DUAL WALL CAPSULES
William H. Breen, Menlo Park, and Gloria F. Sirine, Palo Alto, Calif., assignors, by mesne assignments, to The National Cash Register Company, Dayton, Ohio, a corporation of Maryland
No Drawing. Filed Nov. 23, 1966, Ser. No. 596,447
Int. Cl. A01n 17/00; B01j 13/02; B44d 1/16
U.S. Cl. 252—316                                    4 Claims

ABSTRACT OF THE DISCLOSURE

A process is provided of encapsulating water-sensitive materials, such as toluene diisocyanate, by including in the water-sensitive material a siloxane and in an aqueous phase a silanolate, causing reaction of the siloxane and silanolate at the interface of the water-sensitive material and the aqueous phase to form, very quickly and before the water-sensitive material has been excessively degraded, a precoating of polymer of the siloxane and silanolate, and thereafter providing a more durable permanent coating on the precoated material by coacervation.

---

This invention relates to encapsulation methods which employ the technique of coacervation such as described in Green U.S. Pat. No. 2,800,457.

In a typical application of the coacervation technique as described in the aforesaid Green patent, a water-immiscible liquid such as an oil having dissolved therein an active material such as a dye or a dye precursor, is dispersed in a sol of at least two polymeric materials such as gelatin and gum arabic which have opposite electrical charges. The preparation of this system may take place in two stages, for example, by dispersing the oil in a sol of one of the polymeric materials and mixing with a sol of the other polymeric material, but in any event a system is prepared having the following constituents and properties:

There is a continuous aqueous phase which serves as the vehicle; a water-immiscible material is dispersed therein; the continuous aqueous phase or vehicle has dissolved in it two polymeric materials of potentially opposite electrical charge; and upon appropriate alteration of the system, for example, by adding a salt, by altering pH, by dilution or by other means, the polymeric materials are caused to assume the opposite charge condition and to interact and form a coacervate which is effective to coat and encapsulate the globules of water-immiscible material upon agitation of the system. The water-immiscible material constitutes the internal phase or core of the capsules. It will, therefore, be referred to hereinafter as the "internal phase," it being understood that such term refers to the ultimate capsules and to the fact that in these capsules there is an external seamless coating or encapsulating medium formed from the coacervate, inside of which there is the internal phase which is encapsulated.

An important advantage of this technique is that materials which are volatile, which require physical isolation or which are subject to oxidation can be protected until the time of intended use, when the capsules are broken or extracted to release the internal phase. Another important advantage is that the encapsulation can be carried out en masse, economically and at high speed.

Water-soluble materials such as water-soluble dyes or dye precursors can be dissolved in the internal phase, but if the internal phase is itself water-soluble or if it is reactive with water (for example, if it is subject to hydrolysis), such technique has a disadvantage in that the droplets of internal phase undergo more or less deterioration, e.g., they dissolve in part or in whole or they undergo hydrolysis before encapsulation occurs or the coacervate coating is able to protect the internal phase. Also, the coacervate coating contains water until the capsules have been dried, and the water in the capsule walls is harmful.

In Brynko U.S. Pat. No. 2,969,331 a double encapsulation technique is described in which a monomer is dissolved in the internal phase, such monomer being selected so that its polymer is insoluble in the internal phase. This internal phase containing dissolved monomer is dispersed in a sol of polymeric materials selected to produce a coacervate. Polymerization of the monomer is induced and, since the resulting polymer is insoluble in the internal phase, it migrates to the interface between the internal phase and the aqueous vehicle to form a coating. Thereafter, the globules of internal phase thus precoated with a polymer are further coated by inducing coacervation and coating of the globules by coacervate.

This method is advantageous for the purpose of providing strong walls of capsules and for other purposes but, as applied to a water-sensitive internal phase it has the disadvantage of slow speed of polymerization and/or of diffusion of the polymer to the interface between the internal phase and the aqueous vehicle.

It is an object of the present invention to provide improvements in the encapsulation of water-soluble and/or water-reactive internal phase materials.

It is a further object of the present invention to provide a method whereby globules or particles of water-sensitive internal phase material dispersed in an aqueous vehicle can be quickly and adequately protected by application of a protective precoating such that the precoated globules or particles can then be encapsulated by ordinary coacervation techniques in an aqueous vehicle.

Other objects of the invention will be apparent from the following description and the appended claims.

In accordance with the present invention, globules, droplets or solid particles of internal phase are very quickly precoated in an aqueous vehicle by an interfacial reaction between two reactants, one of which is present in the aqueous vehicle, the other being present in or on the internal phase. This procedure is carried out by (1) dissolving or dispersing a suitable first reactant in the internal phase if the internal phase is a liquid, or applying a surface coating of such first reactive material to the internal phase if the internal phase is a solid; and (2) dissolving or dispersing a second suitable reactant in the aqueous vehicle in which the internal phase is to be dispersed, such first and second reactants being selected to react very quickly at the interface between the internal phase and the aqueous vehicle by a process of interfacial polymerization to form a protective coating on the globules or particles of internal phase. Thereafter, the coated globules or particles of internal phase are more effectively and permanently coated by conventional techniques involving coacervation.

The process of interfacial polymerization is well known and is described, for example, in Morgan, "Condensation Polymers," vol. 6 of Polymer Reviews, published by Interscience Publishers in 1965. In this process a monomeric reactant such as a diamine is dissolved in a first solvent, e.g., water, and the solution is contacted with a solution of a second monomeric reactant such as a diacyl chloride in a solvent such as an organic solvent which is immiscible with the first solvent. The two monomeric reactants react at the interface to form a condensation polymer. The process may, of course, be applied to oligomers of two monomeric reactants.

The process of interfacial polymerization or interfacial polycondensation has been employed to encapsulate droplets of water containing enzymes dissolved in the water, such droplets being dispersed in a water immiscible organic liquid such as ether, see Chang, "Semipermeable Microcapsules," Science, 146, 524, 525 (1964). For example, Chang dissolved 1,6-hexanediamine in an aqueous solution of an enzyme, dispersed it in ether and added sebacoyl chloride. Also, magneteic powders containing terephthaloylchloride have been formed into a paste with acetone and wax and then added to ethylene glycol to encapsulate the iron in a polymer [poly(ethylene terephthalate)] formed by interfacial polycondensation. Br. Pat. 950,443.

For present purposes it is required that the interfacial system (i.e., the monomer dissolved in or dispersed in or on the internal phase and the monomer dissolved in the aqueous phase) react with sufficient speed to provide a protective encapsulating coating before there has been unacceptable deterioration of the internal phase. The systems employed by us and described below satisfy this requirement. The precoat of interfacially produced polymer, although it does not provide a durable coating, is effective to protect the internal phase until it can be more adequately coated by coacervation, e.g., by ordinary coacervation techniques such as described in Green U.S. Pat. No. 2,800,457.

For example, the aqueous vehicle may contain dissolved therein the desired polymeric materials needed for coacervation, for example gelatin and gum arabic; and after the step of interfacial polymerization has been carried out as described above, the pH of the system may be altered, or a salt may be added or the system may be altered in some other way to cause coacervation and encapsulation. The coating thus applied is tougher and more durable than the precoat of interfacially produced polymer. Nevertheless, this precoat is adequate to protect the internal phase from attack by water, and it is formed so rapidly that the internal phase undergoes very little degradation after it is introduced into the system.

The precoated globules or particles of internal phase may be separated from the aqueous system by flotation (or sinking) followed by decantation and then transferred to a coacervate system. However, it is preferred to introduce the internal phase into a potential coacervate system and to carry out the precoating and coacervation in the same system in rapid sequence.

By this means, encapsulated materials such as dyestuffs, dye precursors, and insecticides which are water soluble or water reactive (i.e., which are water sensitive) can be encapsulated in an acqueous system without significant damage. The final, coacervate coating of the capsules may be hardened and made impermeable by well-known methods, such as treatment with formaldehyde, etc.

The following specific examples will serve further to illustrate the practice and advantages of the invention.

EXAMPLE 1

0.75 gram of methyltrimethoxysilane was dissolved in 150 grams of toluene diisocyanate. This constituted the internal phase of the ultimate capsules. Toluene diisocyanate in encapsulated form as produced by coacervation is useful as a component for polyurethane systems, but it is readily hydrolyzed by water. This water-sensitive internal phase was dispersed in 400 ml. of distilled water at 40° C., such water containing dissolved therein 0.75 gram of monosodium trimethyl silanolate

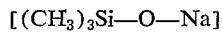

The mixture was agitated to give the desired droplet size. Interfacial polymerization resulted, forming a protective skin about the droplets of internal phase in about 15 to 30 seconds and before substantial hydrolysis occurred. Thereafter, the precoated or encapsulated internal phase is separated and introduced into a coacervate system such as that described in Green U.S. Pat. No. 2,800,457 and is encapsulated by coacervation. A typical coacervation system and procedure which is applicable to this example and to the following examples is as follows:

The dispersion of precoated internal phase droplets or particles is diluted to 600 to 800 ml. total volume with distilled or deionized water at 38 to 40° C. To this is added a sol of 20 grams pigskin gelatin, isoelectric point, 8–9, in 160 ml. water at 50° C. followed by an aqueous sol of 20 grams gum arabic in 160 ml. water at 50° C. The pH is adjusted to 4.5 to 4.8 at which time a complex coacervate forms and deposits around the precoated particles or droplets. The system is now allowed to cool to gel the coacervate. The temperature is then lowered to <10° C., 10 ml. 25% aqueous glutaraldehyde is added, and the system allowed to stir overnight with gradual warming to room temperature. The capsules are now formed and hardened, and may be dried.

Alternatively the gelatin sol may be added at the start (before the precoating step) and the gum arabic solution may be added after the precoating step. In any case where the internal phase is sensitive to an acid pH such as 4.5 to 4.8, other polymeric materials (examples of which are well known) may be used which are operative at or near a neuthal pH.

EXAMPLE 2

0.15 gram of a liquid silicone polymer known as Union Carbide L–31 Silicone Fluid, having the structure

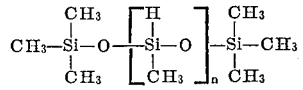

was dissolved in 150 grams of toluene diisocyanate. The solution was dispersed in 600 ml. of distilled water at a pH of 10 and a temperature of 38° C., the water containing dissolved therein 0.15 gram of monosodium trimethyl silanolate. The system was stirred to give the desired droplet size. After about 30 seconds a skin had been formed by cross linking reaction of the silicone polymer with the silanolate. The resulting capsules are then subjected to encapsulation by a coacervate in the usual manner, for example, as described in example above.

EXAMPLE 3

100 grams of finely divided disodium fluorescein were dispersed in a 1% solution, in petroleum ether, of a linear dimethylsilicone polymer fluid having an average degree of polymerization of 100 and having two reactive methoxy end groups per molecule. This polymer had the structural formula

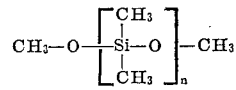

wherein $n$ averages 100. The petroleum ether had a boiling range of about 30 to 60° C. The petroleum ether was evaporated from the solution resulting in solid, finely divided disodium fluorescein coated with the silicone polymer. This silicone coated fluorescein was dispersed in a solution of 1 gram of monosodium trimethyl silanolate in 500 ml. of distilled water at 40° C. A protective skin was very rapidly formed. The resulting capsules are then subjected to encapsulation in a coacervate in the usual manner.

EXAMPLE 4

100 grams of finely divided disodium fluorescein and 1 gram of a 25 centipoise branched dimethylsilicone fluid polymer having an average degree of polymerization of 50 and having an average of three reactive methoxy groups per molecule were placed in a ball mill, which was operated until all of the particles of disodium fluorescein were evenly coated with this silicone. This coated disodium fluorescein was then dispersed in 500 ml. of water at 40° C. having dissolved therein 1 gram of monosodium trimethyl silanolate. A protective skin formed quickly about the particles of disodium fluorescein. The resulting capsules are then encapsulated by coacervation in the usual manner.

EXAMPLE 5

The procedure of Example 4 was repeated except that sodium dichromate, $Na_2Cr_2O_7$ was used instead of disodium fluorescein.

In the examples above, the reactant dissolved in the aqueous phase was monosodium trimethyl silanolate having the formula,

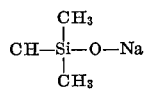

Other alkali metal salts (e.g., K and Li salts) may be used and one or more of the methyl groups may be replaced by higher alkyl groups provided the water-solubility of this reactant is not too greatly impaired. For example, one, two or all three methyl groups may be replaced by the ethyl group.

The reactants described in the examples which are dissolved in or placed upon the internal phase are reactive siloxanes which may be monomers (as in Example 1) or polymers (Examples 2, 3, 4 and 5).

In the practice of the invention, the final product (i.e., the particles of internal phase precoated with a protective polymer and outwardly of such precoat with a more durable coating formed by coacervation), may be cured, as by treatment with formaldehyde, to toughen and strengthen the coating.

It will, therefore, be apparent that a novel and very advantageous method has been found for encapsulating water sensitive materials by the coacervation technique.

We claim:

1. A method of encapsulation which comprises providing a dispersion in an aqueous vehicle of discrete globules or particles of a substance to be encapsulated, such substance being sensitive to and subject to degradation by contact with water, said substance having intimately associated therewith a first reactant and the aqueous vehicle having dissolved therein a second reactant, said first reactant being a siloxane and said second reactant a water soluble silanolate which is polymerizable with the siloxane; causing polymerization of said reactants at the interface of the substance to be encapsulated and the aqueous phase thereby forming a continuous, temporarily protective polymeric precoating about the globules or particles of said substance and preventing further degradation thereof; and then applying to the thus precoated globules or particles a more durable and permanent coating by formation of a coacervate phase of hydrophilic polymeric material in an aqueous medium wherein the precoated particles or globules are suspended and causing the coacervate phase to encapsulate the precoated particles or globules.

2. The method of claim 1 wherein the siloxane is methyl trimethoxysiloxane and the silanolate is an alkali metal trialkylsilanolate.

3. The method of claim 1 wherein the substance to be encapsulated is toluene diisocyanate and the siloxane is dissolved therein.

4. The method of claim 1 wherein the siloxane is methyl trimethoxysiloxane, the silanolate is an alkali metal trialkylsilanolate and the substance to be encapsulated is toluene diisocyanate in which the siloxane is dissolved.

References Cited

UNITED STATES PATENTS

| | | | |
|---|---|---|---|
| 2,453,092 | 11/1948 | Hyde et al. | 260—46.5X |
| 2,512,192 | 6/1950 | Yen et al. | 424—32 |
| 2,744,878 | 5/1956 | Smith-Johannsen | 260—46.5X |
| 3,043,782 | 7/1962 | Jensen | 252—316 |
| 3,161,602 | 12/1964 | Herbig et al. | 252—316 |

FOREIGN PATENTS

| | | | |
|---|---|---|---|
| 950,443 | 2/1964 | Great Britain | 264—4 |

RICHARD D. LOVERING, Primary Examiner

U.S. Cl. X.R.

117—100; 264—4; 424—32, 34, 37